United States Patent [19]

Pike

[11] Patent Number: 4,853,300

[45] Date of Patent: Aug. 1, 1989

[54] AMORPHOUS HYDRATED METAL OXIDE PRIMER FOR ORGANIC ADHESIVELY BONDED JOINTS

[75] Inventor: Roscoe A. Pike, Granby, Conn.

[73] Assignee: United Technologies Corporation, Hartford, Conn.

[21] Appl. No.: 122,495

[22] Filed: Nov. 16, 1987

Related U.S. Application Data

[63] Continuation of Ser. No. 911,580, Sep. 24, 1986, abandoned.

[51] Int. Cl.$^4$ .............................. B32B 9/00; C09J 5/04
[52] U.S. Cl. .................................... 428/702; 156/314; 156/319; 427/337
[58] Field of Search ................ 156/319, 314; 427/337; 428/702

[56] References Cited

U.S. PATENT DOCUMENTS

| | | | |
|---|---|---|---|
| 2,768,909 | 10/1956 | Haslam | 156/332 |
| 2,943,955 | 7/1960 | Brill | 156/319 |
| 4,085,012 | 4/1978 | Marceau et al. | 204/38 A |
| 4,364,995 | 12/1982 | Crawford et al. | 428/336 |
| 4,532,179 | 7/1985 | Takami et al. | 428/335 |
| 4,562,104 | 12/1985 | Maeda | 428/148 |
| 4,623,591 | 11/1986 | Pike | 156/314 |

FOREIGN PATENT DOCUMENTS 654049  6/1951  United Kingdom .

OTHER PUBLICATIONS

Pike, "Inorganic Primers to Bonded Joints and Fiber Reinforced Resin Composites", International Adhesion Conference, 9–1984.

Paper presented at The International Adhesion Conference 1984 titled "Inorganic Primers in Bonded Joints and Fiber Reinforced Resin Composites" by Roscoe A. Pike, Sep. 12–14, 1984, University of Nottingham, London, England.

Primary Examiner—John J. Gallagher

[57] ABSTRACT

An amorphous hydrated metal oxide primer for adhesively bonded articles results in a bond resistant to crack propagation. A plurality of articles at least one of which is ceramic are bonded to one another through a layer of polymeric adhesive. The ceramic article has a layer of amorphous hydrated metal oxide formed by applying and subsequent hydrolysis of a layer comprising $M_xOR_y$ or mixtures thereof. In the formula $M_xOR_y$, x is 1, y is 3 or 4, M is any metal capable of forming a stable alkoxide and R is an organic radical. The bonded joint is preferably made by applying to a surface of at least one ceramic article a layer of $M_xOR_y$ described above. The ceramic article having a layer of metal alkoxide is exposed to moisture and a temperature of about 25° C. to about 300° C. and adhesive is placed in contact with and between the ceramic article and other article. The two bonded articles are then exposed to pressure and optional heat resulting in a joint resistant to crack propagation.

10 Claims, 1 Drawing Sheet

U.S. Patent    Aug. 1, 1989    4,853,300
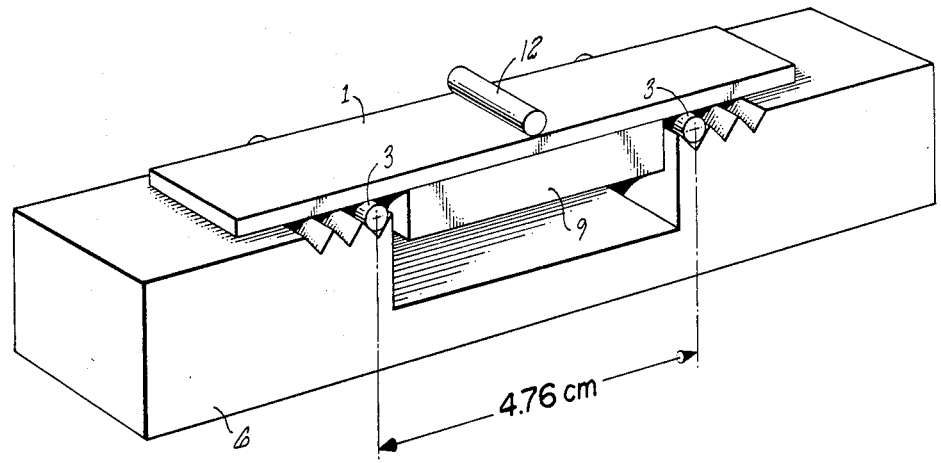

AMORPHOUS HYDRATED METAL OXIDE PRIMER FOR ORGANIC ADHESIVELY BONDED JOINTS

This is a continuation of application Ser. No. 911,580, filed Sept. 24, 1986 now abandoned. CROSS REFERENCE TO RELATED APPLICATION Attention is directed to commonly assigned U.S. Patents entitled "Amorphous Hydrated Metal Oxide Primer for Composite Fibers", U.S. Pat. No. 4,678,820 and "Amorphous Hydrated Metal Oxide Primer for Organic Adhesively Bonded Joints, U.S. Pat. No. 4,623,591, which disclose material similar to that used in the present application, the disclosures of which is hereby incorporated by reference.

TECHNICAL FIELD

The field of art to which this invention pertains is adhesively bonded joints and methods for adhesively bonding joints.

BACKGROUND ART

Weight saving and manufacturing cost benefits have led to the increase in use of adhesively bonded structures in the aircraft and aerospace industries. In order to be a viable alternative to, for example, metal fasteners, these adhesive bonds should maintain the strength typical of conventional fastener systems. In many applications the bonds are put under a variety of environmental and mechanical stresses. For example, frequently these bonds are exposed over long periods of time to wet environments which can result in a loss of bond strength. The loss of strength can result from the extension of cracks and other deformations that occur in the adhesive and which are exacerbated by the moist environment. As a result of this deficiency, extensive research and development efforts have been undertaken to define methods and identify materials which improve bonded joint performance in humid conditions. For example, it is known that surface preparation is important in the bonding of aluminum and titanium. Also, when bonding to ceramic surfaces roughness or porosity and cleanliness are important. Thus, it is essential that before bonding, the adherend is cleaned and chemically pretreated to produce a surface which combines with the adhesive to develop the bond strengths which meet application requirements. A variety of pretreatments for aluminum have been developed to produce improved bondability. These include acid etching (FPL), and anodized treatments with sulfuric (SA), chromic (CAA) and phosphoric acid (PAA). The latter, PAA, is generally accepted as the most effective surface treatment in terms of bond strength and durability at the present time. It has been shown by in depth surface analysis using scanning transmission electron microscopy that the PAA treatment produces fine oxide protrusions of greater length and magnitude than other surface treatments. These whiskers are believed to account for the strength enhancement achieved with joints made using PAA treated adherends. Thus, mechanical interlocking by whisker reinforcement of an adhesive appear to play a role in enhancing adhesive bonding. Porosity in ceramic articles may play a similar role in adhesion to such materials. The probability that chemical interaction is of major importance, depending upon the adhesive/article compositional combination, is also believed. Although the above surface preparations have provided advantages, there is a need for new technology to aid in the advancement of lightweight aerospace-type structures.

Accordingly, there is a constant search in this field of art for new methods of providing lightweight, structurally sound, adhesively bonded joints.

DISCLOSURE OF INVENTION

This disclosure is directed to bonded joints resistant to crack propagation. A plurality of articles are bonded to one another through a layer of polymeric adhesive at least one of said articles being a ceramic article. At least one of the ceramic articles has a layer of amorphous hydrated metal oxide thereon and in contact with the adhesive layer. The layer of amorphous hydrated metal oxide is formed by application onto the ceramic article and subsequent hydrolysis of, a layer comprising $M_x(OR)_y$ or mixtures thereof. In the formula $M_x(OR)_y$, x is 1, y is 3 or 4, M is any metal capable of forming a stable alkoxide and R is an organic radical.

Another aspect of this invention is a method of bonding a plurality of articles together that results in a joint resistant to crack propagation. The method comprises placing a polymeric adhesive in contact with and between the two articles and applying pressure and optional heat to the articles. A layer comprising $M_x(OR)_y$ or mixtures thereof is applied to a surface of at least one of the ceramic articles prior to placing adhesive on the surface. In the formula $M_x(OR)_y$, x is 1, y is 3 or 4, M is any metal capable of forming a stable alkoxide and R is an organic radical. The ceramic article having $M_x(OR)_y$ layer thereon is exposed to moisture and a temperature of about 25° C. to about 300° C. prior to contact with the adhesive.

This amorphous metal oxide primer for adhesively bonded joints provides bonds that are more resistant to crack propagation. Thus, this invention makes a significant advance to the aerospace industry by providing new technology relating to adhesive bonding.

Other features and advantages will be apparent from the specification and claims and from the accompanying drawings which illustrate an embodiment of the invention.

BRIEF DESCRIPTION OF DRAWINGS

The FIGURE illustrates a perspective view of a three-point flexure strength test apparatus for determining the adhesive bond strength of a fiber reinforced resin composite to a ceramic adherend.

BEST MODE FOR CARRYING OUT THE INVENTION

Any metal alkoxide that hydrolyzes to give an amorphous hydrated metal oxide (i.e. a monohydroxy metal oxide) may be used in the practice of this invention. Metal alkoxides having the formula $M_x(OR)_y$ where x is 1 and y is 3 or 4 are preferred in forming the metal oxide primer of this disclosure, y being determined by the particular valence of the metal. y should not be 2 as typically a valence of at least 3 is necessary to form a monohydroxy metal oxide. M is any metal capable of forming a stable alkoxide, which can be purified by, for example, a distillation or crystallization without decomposition; as y is defined above essentially all metals meet this requirement. It is preferred that the metal is selected from the group consisting of titanium, zirconium, silicon, iron, nickel and aluminum. It is especially preferred that the metal is aluminum, magnesium or silicon or mixtures thereof. Typically, R can be any organic radical that can be distilled at temperatures below about 300 degrees centrigrade (0° C.). Since the alkoxide ((OR) moiety) is not incorporated in the primer, the important criteria associated with it is that the resultant alcohol can be volatilized at temperatures that are not high enough to damage the primer or substrate. It is preferred that R is an alkane radical from $C_1$ to $C_{10}$. It is especially preferred that R is methyl, ethyl, propyl or sec-butyl as these radicals are volatilized as alcohols at relatively low temperatures. In addition, the alkoxides can be modified by incorporation of varying amounts of additives such as phosphate, chromate or magnesium oxide without affecting the primer properties. Mixtures of the above metal alkoxides may be used in the practice of this invention. The composition comprising a metal alkoxide cordierite precursor (cordierite: 2 MgO, 2 $Al_2O_3$, 5 $SiO_2$) is a preferred example of such a composition.

The above metal alkoxides hydrolyze to amorphous hydrated metal oxides (primer) when exposed to moisture such as atmospheric moisture or moisture on the ceramic substrate surface and optionally heat as described below. An exemplary reaction believed to occur is that of aluminum alkoxide to alumina. The initial hydrolysation reaction of aluminum alkoxides is empirically illustrated as

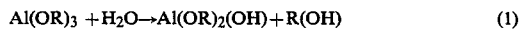

$$Al(OR)_3 + H_2O \rightarrow Al(OR)_2(OH) + R(OH) \quad (1)$$

This reaction proceeds rapidly with further hydrolysation-polymerisation to

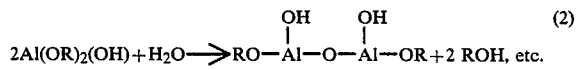

$$2Al(OR)_2(OH) + H_2O \rightarrow RO-\underset{|}{\overset{OH}{Al}}-O-\underset{|}{\overset{OH}{Al}}-OR + 2\ ROH, \text{etc.} \quad (2)$$

to incorporate n aluminum ions, i.e. $Al_{n-1}(OH)_{(n+2)-x}(OR)_x$ assuming linear polymerisation for simplicity. As the reaction proceeds the number of OR groups, i.e. x, relative to n decreases to a value depending on the hydrolysis temperature and available moisture concentration. Under normal application conditions, the ratio of residual OR groups as designated by x is less than 4 and n is 28 or greater. Such low levels of OR do not impede the performance of the primer. In contrast, zirconium alkoxide is believed to hydrolize to a hydrated oxide, i.e. $ZrO_2$. 1.7 $H_2O$ having no residual—OR or OH groups.

The thickness of this primer layer can vary effectively from about 0.15 microns ($\mu$) to about 120 $\mu$. Preferably the thickness is about 0.3$\mu$ to about 1.0$\mu$. Above about 10$\mu$, the layer can be so thick as to create stress risers and to form a weak boundary layer. Below about 0.15$\mu$, the layer does not provide the properties such as crack propagation resistance at the levels typically required. In addition, it is preferable to apply the primer to the ceramic surface with a plurality of layers of metal alkoxide as this facilitates removal of volatiles and solvent which can be more difficult to achieve from a single thick application.

The articles of this invention comprise nonmetallics hereinafter defined as ceramics which inherently have an oxide surface. Ceramics is herein defined as glasses, glass ceramics, "traditional ceramics" and fiber reinforced bodies of the above. Typical exemplary glasses are borosilicates and silicas. Typical exemplary glass ceramics are lithium aluminum silicates and magnesium aluminum silicates. Typical exemplary "traditional ceramics" are oxide ceramics such as alumina or zirconia and silicon based ceramics such as silicon carbide or silicon nitride which naturally exist with a silica film. However, this list is not meant to be exhaustive and those skilled in the art will know others. In addition, a primed ceramic article can be bonded to a solid polymeric article or conventional fiber reinforced polymeric matrix composite such as an epoxy, polyimide, polyester, acrylic, urethane, cellulosic, rubber or phenolic based composite. Examples of fibers include glass, alumina, silicon carbide, graphite, amides and Kevlar ® fiber (DuPont DeNemours, E.I., Co., Wilmington, Del.). Also, any primed ceramic article can be bonded to any metal article which may optionally be treated with the inorganic primer of this invention.

Typically, the surface is cleaned prior to primer application to provide the ceramic surface with an adhesive receptive quality. For example, conventional surface cleaning agents are various freons, methylene, chloride, trichloroethylene, etc. In addition, the surface is preferably abraded to enhance surface roughness.

Typical surface treatments for preparing a resin matrix composite surface include solvent cleaning, abrasion (e.g., emery cloth, sand blasting) followed by solvent washing.

Any conventional adhesive can be used for the practice of this invention that is useful for bonding articles, particularly ceramic, organic composite or metallic articles. For example, epoxide, polyurethane, acrylic or polyimide adhesives are used as these provide the properties most desired such as good strength. It is especially preferred to use epoxy or urethane adhesives as they resist environmental stresses, are strong and are frequently chosen for aerospace applications.

Any method of bonding may be used for the practice of this invention that provides an amorphous, hydrated metal oxide coated ceramic article bonded to another article with an adhesive. If a plurality of ceramic articles are to be bonded, it is preferred to prime each ceramic article. It is also preferred to apply a layer of metal alkoxide to the ceramic article(s) by a solvent casting, dipping or spraying procedure. The metal alkoxide coated ceramic articles are then maintained at a temperature of about 25° C. to about 300° C. in the presence of moisture. Below 25° C., the reaction kinetics are typically too slow and above 300° C. crystalization of the oxide primer surface may occur with an accompanying loss of mechanical strength. The application of the inorganic primer for field repair situations is also possible with the use of the lower conversion temperatures.

The adhesive is applied by conventional methods to the articles and they are joined together with the application of conventional pressures, temperatures and times appropriate for the adhesive used.

EXAMPLE 1

Slip cast silica ceramic adherends were solvent cleaned by flushing with freon solvent and then E-8385 aluminum alkoxide available from Stauffer Chemical Company, (Fairfield, Conn.), was diluted to 1% with toluene and applied to the silica adherends by solvent casting (brushed on). The aluminum alkoxide was converted to amorphous alumina by solvent evaporation at room temperature after which a coating of EA-934 TM epoxy adhesive, available from Hysol (Pittsburgh, California) was applied to the amorphous alumina coated adherends. A strip of Kevlar ™ (DuPont DeNemours, Inc., Wilmington, De.) reinforced epoxy composite, 60 mils thick, was solvent cleaned, sand blasted with 60 grit alumina followed by solvent cleaning and mated to the ceramic adhesive coated article in a suitable jig. A stop was placed between the composite and jig supports to insure a bondline thickness of 10 mils. The articles were clamped and allowed to stand seven days to cure the adhesive. The bonded part was removed from the jig, excess fillet removed and immersed in boiling water for 40 hours. Testing of the wet specimens was carried out using the test fixture depicted in the Figure. The results are listed in Table I.

EXAMPLE 2

In a similar manner, the ceramic article was treated with a 1% toluene solution having the metal alkoxide precursor composition of cordierite (2 MgO, 2 $Al_2O_3$, 5 $SiO_2$) E 8385.6 composition available from Stauffer Chemical Company (Fairfield, Ct). After application of the primer, the articles were heated at 120° C. for 10 minutes to facilitate solvent removal and hydrolysis of the alkoxide. The Kevlar-epoxy composite was similarly treated as in Example 1 and the two adherends bonded with the EA-934. The bonded articles were allowed to stand for seven days to effect adhesive cure. The bonded articles were immersed in boiling water for 24 hours and tested using the test fixture depicted in the Figure. Test results are listed in Table II.

EXAMPLE 3

As a control sample specimens of the silica ceramic were obtained which were primed with an organic primer, HT-424 ™ available from American Cyanamid (Wayne, N.J.). The treatment of the Kevlar-epoxy composite surface was the same as described in Example 1. The two articles were bonded together using the Hysol EA-934 adhesive. After seven days, the bonded specimens were immersed in boiling water for 24 hours and tested using the test fixture depicted in the FIGURE. The results are listed in Table III.

These adhesively bonded aluminum joints are particularly resistant to crack propagation. A clear understanding of this may be had by reference to the Figure and Tables.

The tables compile data on a three-point flexure strength test. The Figure illustrates the test apparatus used to supply the data. According to the Figure, a composite 1 is supported on two cylinders 3 which are separated by a 4.76 cm span. The cylinders in turn rest on a suitable support 6. A ceramic adherend 9 which is bonded to the composite 6 lies underneath the composite 1 and between the cylinders 3. Application of pressure to a third cylinder 12 (which rests across the top center of the composite 1) results in debonding of the ceramic adherend from the composite by crack formation at the ceramic-adhesive interface. A measure of the adhesive bond strength is obtained by the pressure required to initiate a crack in this three-point flexure strength test.

It is believed the results listed in Tables I, II and III that the inorganic primers provide a 100% increase in load to initiate a shear crack (wet condition) compared to the organic control; bond strengths below 50 lbs. (measured as load to initiate a shear crack) produces all adhesive/ceramic interfacial failure; and the inorganic primers (2 coats) provide mixed failure modes of adhesive/composite and adhesive/ceramic interfaces.

TABLE I

CERAMIC/COMPOSITE JOINTS
Primer: Alumina $[AlO(OH)]_x$

| Sample Type[a] | Time in Boiling Water (Hrs) | Lbs. to Fracture |
|---|---|---|
| No Primer | 40 | 2.4 |
| Alumina (2 coats) | 40 | 68 |
| Alumina (3 coats) | 40 | 63 |
| Alumina (4 coats) | 40 | 54 |
| HT-424 (control) | 24 | 31 |
| HT-424 (control) | 40 | 20 |

[a]Alumina primer on ceramic adherend was air dried at Room Temperature - 15 minutes prior to bonding.

TABLE II

CERAMIC/COMPOSITE JOINTS
Primer: Metal Alkoxoide Cordierite Precursor

| Sample Type[a] | Time in Boiling Water (Hrs) | Lbs. to Fracture |
|---|---|---|
| Cordierite (2 coats) | 24 | 54 |
| Cordierite (4 coats) | 24 | 45 |
| HT-424 (control) | 24 | 31 |

[a]Alkoxide primer on ceramic adherend heated at 120° C. for 10 minutes prior to bonding.

TABLE III

CERAMIC/COMPOSITE JOINTS
Primer: HT-424[a]

| Sample Type | Time in Boiling Water (Hrs) | Lbs. to Fracture |
|---|---|---|
| 1 | 24 | 30.5 |
| 2 | 24 | 37.5 |
| 3 | 24 | 25 |

[a]Primer cured at 170° C. after application prior to bonding.

This primer may be used to advantage in bonding ceramic to other ceramics or to resin composites, metal, fiber reinforced ceramics or solid plastics. In addition, it may be applied to articles to aid in adhesion of coatings such as with plastic packaged microelectronic devices. While this invention has been described in terms of a metal alkoxide a mixture of various metal alkoxides can be used.

This primer coating provides improved crack propagation resistance in moist environments. The resulting properties such as tensile and T-peel strengths of bonded joints made with the inorganic primer are at least equivalent to bonded joints made using conventional organic primers. Yet the inorganic primers can be utilized at thinner layers than the 5μ to 10μ layers typical of organic primers. Thicker layers tend to set up stress rises (i.e. weak boundary layer) as the components segregate. Also, because of its thermal stability the inorganic primer can be used equally as well with high temperature adhesives such as polyimides or with low temperature adhesives such as epoxy systems unlike organic primers which are typically temperature specific. Another major advantage of the inorganic primer is that it can be used on ceramic surfaces which have been treated by a variety of surface treatments and provide the same high level of crack propagation resistance. In contrast, organic primers produce different results dependent upon the surface pretreatments employed. In addition, conventional organic primers use strontium chromates as corrosion inhibitors and these cause toxicity problems in their manufacture and use. This invention provides an amorphous hydrated metal oxide primer for adhesively bonded joints that results in greatly increased crack propagation resistance. Thus, it makes a significant advance in the aerospace industry by providing new technology relating to adhesively bonded joints.

It should be understood that the invention is not limited to the particular embodiments shown and described herein, but that various changes and modifications may be made without departing from the spirit and scope of this novel concept as defined by the following claims.

I claim:

1. A method of bonding a plurality of articles together, at least one of which is ceramic, by placing a polymeric adhesive in contact with and between the articles and applying pressure, and optionally heat, to said articles wherein the improvement comprises:
   (a) applying to a surface of the at least one ceramic article prior to placing adhesive on the surface a layer comprising $M_x(OR)_y$ or mixtures thereof, wherein
      (i) x is 1;
      (ii) y is 3 or 4;
      (iii) M is silicon or magnesium; and
      (iv) R is an organic radical;
   (b) exposing the ceramic article having the $M_x(OR)_y$ layer
   thereon to moisture and a temperature of about 25° C. to about 300° C. prior to contact with the adhesive; resulting in a joint resistant to crack propagation.

2. The method of bonding as recited in claim 1 wherein at least one of the articles is a fiber reinforced polymeric composite.

3. The method of bonding as recited in claim 1 wherein at least one of the article is a fiber reinforced ceramic composite.

4. The method as recited in claim 1 wherein M is silicon.

5. The method as recited in claim 1 wherein M is magnesium.

6. A plurality of articles bonded to one another through a layer of polymeric adhesive, at least one of said articles, being a ceramic article wherein the improvement comprises the at least one ceramic article having a layer of amorphous hydrated metal oxide thereon and in contact with the adhesive layer, the layer of amorphous hydrated metal oxide being formed by application onto the ceramic article and subsequent hydrolysis of a layer comprising $M_x(OR)_y$ or mixtures thereof, where
   (a) x is 1;
   (b) y is 3 or 4;
   (c) M is silicon or magnesium; and
   (d) R is an organic radical; resulting in a bond resistant to crack propagation.

7. The bonded articles of claim 6 wherein at least one article is a fiber reinforced polymeric composite.

8. The bonded articles of claim 6 wherein at least one article is a fiber reinforced ceramic composite.

9. The bonded articles of claim 6 wherein M is silicon.

10. The bonded articles of claim 6 wherein M is magnesium.

* * * * *

UNITED STATES PATENT AND TRADEMARK OFFICE
CERTIFICATE OF CORRECTION

PATENT NO. : 4,853,300
DATED : August 1, 1989
INVENTOR(S) : ROSCOE A. PIKE

It is certified that error appears in the above-identified patent and that said Letters Patent is hereby corrected as shown below:

Col. 3, line 36, after "i.e." "$Al_n-1$" should be --$Al_nO_{n-1}$--

Signed and Sealed this

Twenty-second Day of May, 1990

Attest:

HARRY F. MANBECK, JR.

Attesting Officer     Commissioner of Patents and Trademarks